Dec. 30, 1969     W. L. McGRATH     3,486,985
FLASH DISTILLATION APPARATUS WITH REFRIGERANT
HEAT EXCHANGE CIRCUITS
Original Filed Oct. 21, 1965
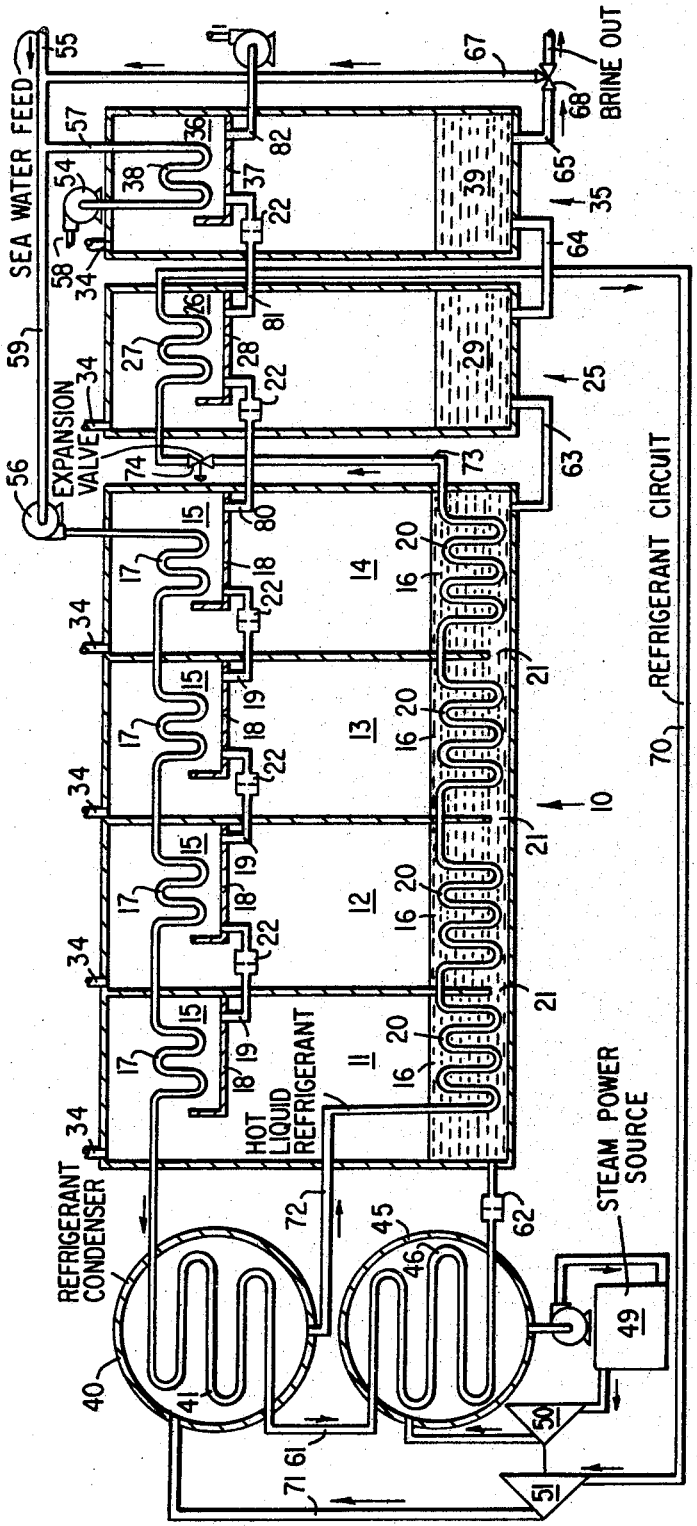
INVENTOR.
WILLIAM L. MC GRATH.
BY
*Frank N. Decker Jr.*
ATTORNEY.

United States Patent Office 3,486,985
Patented Dec. 30, 1969

3,486,985
FLASH DISTILLATION APPARATUS WITH REFRIGERANT HEAT EXCHANGE CIRCUITS
William L. McGrath, Syracuse, N.Y., assignor to Carrier Corporation, Syracuse, N.Y., a corporation of Delaware
Continuation of application Ser. No. 499,845, Oct. 21, 1965. This application Mar. 18, 1969, Ser. No. 808,206
Int. Cl. C02b 1/06; B01d 3/06, 3/02
U.S. Cl. 202—173                                            1 Claim

ABSTRACT OF THE DISCLOSURE

A system for flash distillation of sea water to form potable water having a flash evaporator, a refrigerated flash evaporator, and an additional flash evaporator, compressor, condenser and refrigerant evaporator disposed in the refrigerated flash evaporator, and a boiler, turbine and turbine steam condenser. Sea water is passed through condensing sections in the flash evaporator thence through the refrigerant condenser and the turbine steam condenser to heat the incoming sea water, which is then passed backwardly through the evaporator sections of the flash evaporator, the refrigerated flash evaporator, and the additional flash evaporator, where the heated sea water is successively flashed to form water vapor. The water vapor is condensed in the condensing sections of each of the flash evaporators to form product water. Heat is removed from the condensing section of the refrigerated flash evaporator and pumped to the incoming sea water through the refrigerant condenser via the refrigerant compressor. The condensed refrigerant is then passed through heat exchanger in the evaporating sections of the flash evaporator to subcool the refrigerant and assist in flashing water from the solution in the evaporating sections.

---

This application is a continuation of my copending application Ser. No. 499,845, filed Oct. 21, 1965.

This invention relates to separation systems and more particularly to separation systems which employ a refrigeration cycle and are adapted for separating a solvent from a solution. Systems of the type herein described are particularly useful for converting sea water to potable water and the invention will be described in that context.

Among the various types of saline water conversion systems which have been proposed, the so-called "flash distillation process," has found considerable favor due to its compactness and its theoretically, potentially low operating costs.

However, attempts to provide large scale potable water production by the flash distillation process have generally resulted in proposals having an excessive initial cost due to the enormous heat transfer surface required to make the plant's operating cost favorable.

In spite of this disadvantage, the availability of large quantities of low cost steam from atomic power generation plants made the flash distillation process especially attractive for large size saline water conversion plants. Any increase in efficiency of the flash distillation cycle which results in a decrease in the operating costs of the plant has a significant effect on the economic attractiveness of the overall system.

One way in which the cost of obtaining potable water can be materially reduced is by providing a refrigeration cycle to absorb low-grade heat from effluent of the still or from any other convenient heat source at a favorable temperature level and convert it into high temperature heat which is then added to the sea water input to the still. By this means, the steam requirement and therefore the energy cost for producing fresh water can be cut approximately in half and the cost of the overall plant can also be reduced since the size of the steam generation equipment is thereby reduced.

Various additional improvements in the saline water conversion apparatus can be employed to reduce the cost of operation of the still. However, such improvements normally result in adding a number of heat exchangers in the system or otherwise increasing the heat transfer surface elsewhere in the system, thereby eliminating the advantage gained in reducing the operating costs of the system.

For example, it has been previously proposed to utilize a steam driven turbine to operate the compressor of a heat pump, as previously described, and to condense the exhaust steam from the turbine in a heat exchanger which supplied heat to operate a second flash distillation still. While such a system is moderately efficient from a thermodynamic point of view, the system is complex and requires two major flash distillation stills, yet does not provide optimum efficiency.

Accordingly, it is a principal object of this invention to provide an improved apparatus and method for separating solvent from a solution by means of a refrigeration cycle.

It is a further object of this invention to provide a relatively simple, inexpensive, and thermodynamically highly efficient separation system and method of separation which employs a refrigeration cycle and is especially suited for rendering saline water potable.

These objects are achieved in a preferred embodiment of this invention by providing a saline water conversion plant having a main flash evaporator, a refrigerant evaporator, a refrigerant condenser, and a power fluid condenser connected to distill fresh water from the saline water fed to the system. A heat pump is employed to absorb heat from a suitable portion of the system such as by condensing fresh water and to reject that heat at a higher temperature to the seat water introduced into the evaporating sections of the flash evaporator. Sea water is introduced into the system through a heat exchanger in the condensing sections of the flash evaporator where it absorbs heat by cooling and condensing water vapor to provide fresh water product from the system. The heated sea water passes from the condensing sections through the refrigerant condenser and power fluid condenser where it absorbs heat by cooling and condensing refrigerant and power fluid respectively. The heated sea water is then introduced into the evaporating sections of the flash evaporator where the sea water is flashed to provide water vapor to the respective condensing sections. In this embodiment of the invention refrigerant is evaporated in the condensing section of a refrigerated flash evaporation stage where the refrigerant absorbs heat by cooling and condensing water vapor to provide additional fresh water. The refrigerant is then compressed and condensed in the refrigerant condenser.

In accordance with this invention, the relatively hot condensed refrigerant is passed from the refrigerant condenser through a heat exchanger in several of the evaporating sections of the main flash evaporator to subcool the refrigerant while at the same time providing additional heat to increase the quantity of water vapor formed in the flash evaporator, thereby materially increasing the efficiency of the system and reducing the cost of obtaining fresh water from it. At the same time, the use of subcooled refrigerant in the refrigerant evaporator also increases the amount of water vapor condensed for each pound of refrigerant, thus reducing the power expended in the refrigeration system or increasing its capacity at no increase in power.

The apparatus and method of separating solvent from a solution in accordance with this invention provides a material decrease in the operating costs of the system. At the same time, the system in accordance with this invention does not require larger heat transfer surface in the system but actually permits a reduction in heat transfer surface per unit of output if desired.

The above and other objects of this invention will be more readily understood from the following detailed description and with reference to the attached drawing wherein the figure is a cross-sectional schematic flow diagram of a saline water conversion plant in accordance with this invention.

Referring particularly to the drawing, there is shown a separation system for separating a solvent component from a solution. While the apparatus and method to be described has general application, it will be assumed, for purpose of illustrating the best known embodiment thereof, that it is desired to separate fresh or potable water from sea water. It will be appreciated, however, that other solvents and other solutes can be separated by the method and apparatus described, and that the end product of the system may comprise either concentrated solution, as in a fruit juice concentration process, or may comprise the solvent, as in a saline water conversion process.

The major component of the apparatus illustrated comprises a flash evaporator or still 10 which is divided into a plurality of stages 11, 12, 13, and 14, respectively. Each stage of flash evaporator 10 has a condensing section 15, preferably located adjacent the upper portion thereof, and solution evaporating section 16 preferably located adjacent the lower portion thereof. The condensing section of each stage includes portions of a heat exchanger 17 and the portions of the heat exchanger of each stages are preferably connected in series with the heat exchangers of adjacent stages to provide a continuous path for flow of a cooling medium through the condensing sections. Each of the stages of flash evaporator 10 are also provided with condensate pan 18 disposed below the heat exchanger for collecting condensate formed thereon. The condensate pans of each stage are connected by a condensate line 19 and restrictor or flow control means 22 to provide a continuous path for condensate to flow through flash evaporator 10. The solution evaporating sections of all or some of the stages of flash evaporator 10 are also provided with portions of a heat exchanger 20, each of which is preferably connected in series with the portions of the heat exchanger disposed in adjacent stages. A restricted solution passage 21 is provided between each of the evaporating sections of flash evaporator 10 to provide a continuous path for the proper rate of flow of solution through the flash evaporator. The condensing and evaporating sections of each stage are in communication with each other to allow vapor to pass from the evaporating sections of the condensing sections.

A refrigerated flash evaporator stage 25 has a condensing section 26 adjacent the upper portion thereof which is provided with a heat exchanger 27 and a condensate pan 28. Refrigerated flash evaporator 25 also includes a solution evaporating section 29 preferably adjacent the lower portion thereof which is in communication with condensing section 26.

An additional flash evaporator stage 35 may be employed, as shown, and has a condensing section 36 preferably adjacent the upper portion thereof in which is disposed a condensate pan 37 and a heat exchanger 38. Additional flash evaporator stage 35 also includes an evaporating section 39 adjacent the lower portion thereof in communication with condensing section 36. It will be understood that additional flash evaporator stage 35 may actually comprise several stages and can be combined, along with refrigerated flash evaporator 25 as added stages of flash evaporator 10. A suitable purge unit of known construction (not shown) is employed to purge the stages, through lines 34, of non-condensible gases.

The system also includes a refrigerant condenser 40 having a heat exchanger 41 therein and a power fluid condenser 45 having a heat exchanger 46 therein. A boiler or other source of power fluid vapor 49 is provided to supply power fluid vapor to a turbine 50 which is connected to directly or indirectly operate a refrigerant compressor 51. For example, turbine 50 could be connected to operate an electrical generator which in turn could operate an electric motor to drive compressor 51.

In operation, sea water or other solution from which it is desired to separate solvent is introduced to the apparatus through inlet line 55. The sea water passes into line 59 and a portion of the sea water passes through line 57 where it passes through heat exchanger 38 in additional flash evaporator stage 35 and is discharged from the system, through pump 54 and line 58. Sea water also passes from line 59 through pump 56 and through the series of heat exchangers 17 in the condensing section of the stages of flash evaporator 10.

The relatively cool sea water passing through the condensing sections of flash evaporators 35 and 10 cools and condenses water vapor present in the condensing section by absorbing heat from the water vapor, thereby heating the sea water during its passage through the heat exchangers. The heated sea water then passes from the condensing sections of the main flash evaporator through the heat exchangers 41 and 46 respectively of refrigerant condenser 40 and power fluid condenser 45. In each of the condensers, the heated sea water, which is relatively cool with respect to the vapor in the condensers, cools and condenses the vapor therein while picking up the heat of condensation to further heat the sea water.

The relatively hot sea water then passes from the refrigerant and power fluid condensers through restricted line 62 into the evaporating sections of flash evaporator 10. The hot sea water flashes down to the pressure established by the temperature of heat exchanger 17 in the condensing section of stage 11, thereby providing water vapor to the condensing section and cooling the sea water slightly. The slightly cooled sea water then passes from stage 11 of flash evaporator 10 through passage 21 into stage 12. The sea water passing through heat exchanger 17 in stage 12 is at a lower temperature than that passing through heat exchanger 17 in stage 11. Consequently, the pressure in stage 12 of flash evaporator 10 is slightly lower than the pressure in stage 11 thereof. For this reason, additional water vapor will flash from the solution which has passed from the evaporating section of stage 11 to the evaporating section of stage 12. This process of flashing additional water vapor is repeated in each of the stages of flash evaporator 10. While, for convenience of illustration, flash evaporator 10 has been shown as having four stages, in actual practice flash evaporator 10 may have 40 or more stages to optimize the thermodynamic efficiency.

The flash cooled, concentrated, brine solution emerges from the lowest pressure stage 14 of flash evaporator 10 through line 63 from which it is passed into the solution evaporating section 29 of refrigerated flash evaporator stage 25. The pressure in evaporator stage 25 is lower than the pressure in the last stage 14 of flash evaporator 10 and, consequently, additional water vapor is flashed in solution evaporating section 29 from which the water vapor passes into condensing section 26 of refrigerated flash evaporator 25.

The more highly concentrated brine is then passed from solution evaporating section 29 through line 64 into evaporating section 39 of additional flash evaporator stage 35. Flash evaporator stage 35 is at a still lower pressure than the pressure in refrigerated evaporator 25 since the temperature of the incoming solution is lower than the temperature at which the refrigerant evaporates and additional water vapor is flashed from the solution in second flash evaporator 35. The flashed water vapor passes from evaporating section 39 into condensing section 36.

The relatively highly concentrated brine is discharged from evaporating section 39 through line 65. The concentrated brine is split into two portions by diverting valve 68. One portion of the brine is recirculated through the system by passing through line 67 to inlet line 55. The other portion of the brine, is discharged from the system. The ratio of recirculated brine to discharged brine is adjusted in a manner to prevent excessive concentration of solute in the apparatus. It will be understood that a suitable pump or plurality of pumps may be employed at desired locations to forward solution through the lines connecting the components of the apparatus.

While cool sea water is employed to condense water vapor in the condensing sections of flash evaporator 10 and 35, refrigerant is employed to condense water vapor in the condensing section of refrigerated flash evaporator 25. Relatively cool liquid refrigerant is supplied from expansion valve 74 into heat exchanger or evaporator 27 in condensing section 26 of refrigerated evaporator 25. The refrigerant passes in heat exchange relation with water vapor in condensing section 26 thus condensing fresh water at the same time causing the refrigerant to evaporate. While any volatile fluid may be used as a refrigerant, favorable thermodynamic characteristics are found with either methyl chloride having the formula $CH_3Cl$, or dichloromonofluoromethane having the chemical formula $CHCl_2F$.

The evaporated refrigerant is withdrawn from evaporator 27 through vapor line 70 and is compressed by refrigerant compressor 51. The compressed refrigerant passes through line 71 to refrigerant condenser 40 where it is condensed by heat exchange with partially heated sea water through heat exchanger 41. Thus, heat is pumped from the condensing fresh water effluent to sea water input to the evaporating sections of flash evaporator 10.

In accordance with this invention, the relatively warm condensed liquid refrigerant passes through refrigerant liquid line 72 into the heat exchanger 20 in the evaporator section of one of the stages of flash evaporator 10. The refrigerant liquid passes through successive stages of the flash evaporator in heat exchange relation with sea water in the evaporating sections thereof. The hot liquid refrigerant is cooled by giving up heat to the sea water in the evaporating sections of the flash evaporator stages and therefore causes additional generation of water vapor.

The subcooled refrigerant liquid emerges from the last section of heat exchanger 20 in flash evaporator 10 and is passed through line 73 and expansion valve 74 to heat exchanger 27 in refrigerated flash evaporator 25 as previously described. In practice, sections of heat exchanger 20 may be present in only some of the stages of flash evaporator 10, if desired.

The subcooling of refrigerant liquid has an especially advantageous effect on cycle efficiency which results in a reduction in the water production costs of the system. This effect is achieved because heat is given up from the condensed refrigerant to assist in the generation of water vapor in the flash evaporator stages. At the same time, it is thermodynamically desirable to supply subcooled refrigerant to heat exchanger 27, which comprises the refrigerant evaporator coil of refrigerated flash evaporator 25 because the amount of water vapor condensed is thereby increased and the power demand on compressor 51 is materially reduced.

A system in accordance with this invention results in a materially smaller and less costly saline water conversion or separation apparatus or one which will produce a desired quantity of product at a lesser expenditure of energy.

The advantages of this invention can be achieved in various physical arrangements thereof and with other types of distillation apparatus such as a submerged coil evaporator still. Consequently, while there has been described, for purposes of illustration, a preferred embodiment of this invention, it will be appreciated that the invention may be otherwise embodied within the scope of the following claim.

I claim:
1. An apparatus for separating solvent from a solution comprising:
 (A) a flash evaporator having a condensing section and an evaporating section, said condensing section having a heat exchanger therein, and said evaporating section having a heat exchanger therein;
 (B) a refrigerated flash evaporator having a condensing section comprising a heat exchanger for evaporating refrigerant and a solution evaporating section;
 (C) a refrigerant condenser comprising a heat exchanger for condensing refrigerant;
 (D) means to pass said solution through the heat exchanger in said condensing section of said flash evaporator in heat exchange relation with solvent vapor therein to heat said solution and to simultaneously condense solvent in said condensing section;
 (E) means to pass said solution from said condensing section of said flash evaporator into heat exchange relation with refrigerant vapor in said refrigerant condenser to further heat said solution and to simultaneously condense refrigerant vapor in said refrigerant condenser;
 (F) a refrigerant compressor, connected to be driven by a heat operated prime mover, to compress refrigerant vapor;
 (G) passage means to pass said solution from said refrigerant condenser in heat exchange relation with a working fluid discharged from said heat operated prime mover to further heat said solution and to cool said working fluid;
 (H) means to pass the solution successively heated by rejection of heat from said condensing refrigerant and said prime mover into the evaporating section of said flash evaporator to flash solvent vapor therefrom, thereby providing solvent vapor for condensation in said condensing section of said flash evaporator;
 (I) means to pass liquid refrigerant from said refrigerant condenser through an expansion means and then through the heat exchanger in said refrigerated flash evaporator to absorb heat from solvent vapor therein to condense said solvent;
 (J) passage means to pass refrigerant vapor evaporated in said refrigerated flash evaporator to said refrigerant compressor and from said refrigerant compressor to said refrigerant condenser to condense said refrigerant vapor therein; and
 (K) means to pass solution from the evaporating section of said flash evaporator to the evaporating section of said refrigerated flash evaporator to flash additional solvent therefrom, thereby providing solvent vapor in the condensing section of said refrigerated flash evaporator.

References Cited

UNITED STATES PATENTS

| 3,243,359 | 3/1966 | Schmidt | 203—26 X |
| 3,248,305 | 4/1966 | Williamson | 202—180 |
| 3,300,392 | 1/1967 | Ross et al. | 203—11 |
| 3,399,118 | 8/1968 | Williamson | 202—173 |
| 3,396,086 | 8/1968 | Starmer | 202—183 |

NORMAN YUDKOFF, Primary Examiner

F. E. DRUMMOND, Assistant Examiner

U.S. Cl. X.R.

62—238; 203—11, 24, 88, 100